United States Patent
Schmidt et al.

(10) Patent No.: US 10,387,129 B2
(45) Date of Patent: Aug. 20, 2019

(54) DEPLOYMENT OF ENVIRONMENT-AGNOSTIC SERVICES

(71) Applicant: General Electric Company, Schenectady, NY (US)

(72) Inventors: Marc-Thomas Schmidt, Danville, CA (US); Suparna Pal, Dublin, CA (US); Vipul Parmar, San Jose, CA (US)

(73) Assignee: General Electric Company, Schenectady, NY (US)

(*) Notice: Subject to any disclaimer, the term of this patent is extended or adjusted under 35 U.S.C. 154(b) by 10 days.

(21) Appl. No.: 15/638,148

(22) Filed: Jun. 29, 2017

(65) Prior Publication Data

US 2019/0004779 A1    Jan. 3, 2019

(51) Int. Cl.
| | |
|---|---|
| *H04L 29/08* | (2006.01) |
| *G06F 9/445* | (2018.01) |
| *H04L 29/06* | (2006.01) |
| *G06F 8/60* | (2018.01) |
| *G06F 9/46* | (2006.01) |
| *G06F 8/30* | (2018.01) |

(52) U.S. Cl.
CPC ............... *G06F 8/60* (2013.01); *G06F 8/31* (2013.01); *G06F 9/445* (2013.01); *G06F 9/46* (2013.01)

(58) Field of Classification Search
CPC ..... G06F 8/20; G06F 8/30; G06F 8/41; G06F 8/71; G06F 8/447; G06F 9/44505; G06F 9/44521; G06F 9/45516; G06F 8/60; G06F 8/31; G06F 9/445; G06F 9/46; H04L 67/303; H04L 67/10; H04L 67/306; H04L 67/34
See application file for complete search history.

(56) References Cited

U.S. PATENT DOCUMENTS

| | | | |
|---|---|---|---|
| 8,839,223 B2 | 9/2014 | Kirchev et al. | |
| 8,850,420 B2 | 9/2014 | Yousouf et al. | |
| 9,256,413 B2 | 2/2016 | Ivanov et al. | |
| 9,286,050 B2 * | 3/2016 | Moore | G06F 8/62 |
| 9,329,850 B2 | 5/2016 | Gschwind et al. | |
| 9,489,229 B2 | 11/2016 | Gschwind | |

(Continued)

OTHER PUBLICATIONS

Karuzaki et al., Consolidating diverse user profiles based on the profile models of adaptive systems, 6 pages (Year: 2014).*

(Continued)

*Primary Examiner* — Thuy Dao

(74) *Attorney, Agent, or Firm* — Fitch, Even, Tabin & Flannery LLP

(57) ABSTRACT

Systems and methods for deploying runtime environment-agnostic services are presented. In an example embodiment, an indication is received of a runtime environment in which a first programming code and a second programming code are to execute. The second programming code includes a dependency to the first programming code that is abstracted from the runtime environment. An artifact of the first programming code and an artifact of the second programming code are accessed from a data store based on the indication of the runtime environment. The artifact of the first programming code and the artifact of the second programming code are integrated to yield integrated programming code. The integrated programming code is deployed to the indicated runtime environment.

19 Claims, 10 Drawing Sheets

(56) References Cited

U.S. PATENT DOCUMENTS

| | | | |
|---|---|---|---|
| 9,697,374 B2* | 7/2017 | Haik | G06F 21/53 |
| 9,813,318 B2* | 11/2017 | Iyoob | H04L 43/08 |
| 10,078,537 B1* | 9/2018 | Nanda | G06F 16/188 |
| 2013/0346465 A1 | 12/2013 | Maltz et al. | |
| 2014/0068611 A1* | 3/2014 | McGrath | G06F 9/45533 |
| | | | 718/1 |
| 2014/0082048 A1 | 3/2014 | Khalidi et al. | |
| 2015/0112829 A1* | 4/2015 | Jaroker | G06F 8/60 |
| | | | 705/26.5 |
| 2015/0281964 A1* | 10/2015 | Seo | H04L 63/102 |
| | | | 726/9 |
| 2016/0217050 A1* | 7/2016 | Grimm | G06F 11/203 |
| 2017/0060574 A1 | 3/2017 | Malladi et al. | |
| 2017/0116038 A1* | 4/2017 | Netto | G06F 9/4881 |
| 2017/0147335 A1* | 5/2017 | Parees | G06F 8/71 |
| 2017/0242617 A1* | 8/2017 | Walsh | G06F 3/0644 |
| 2017/0277521 A1* | 9/2017 | Sharma | G06F 9/4498 |
| 2017/0277800 A1* | 9/2017 | Lucas | G06F 9/4498 |
| 2018/0150258 A1* | 5/2018 | Walsh | G06F 3/0673 |
| 2018/0349152 A1* | 12/2018 | Rykowski | H04L 41/0806 |

OTHER PUBLICATIONS

Pahl, Claus, et al., "A Container-Based Edge Cloud PaaS Architecture Based on Raspberry Pi Clusters", 2016 IEEE 4th International Conference on Future Internet of Things and Cloud Workshops (FiCloudW), (2016), 117-124.

* cited by examiner

DEPLOYMENT OF ENVIRONMENT-AGNOSTIC SERVICES

TECHNICAL FIELD

Embodiments of the present disclosure relate generally to data processing and, more particularly, but not by way of limitation, to a method and system for deployment of runtime environment-agnostic services.

BACKGROUND

Many industry-related businesses (e.g., manufacturing companies, electrical utilities, transportation companies, etc.) are employing at least some aspects of the "industrial Internet" or the industrial "Internet of Things" (e.g., industrial IoT, or IIoT) to help manage and employ industrial assets (e.g., power plants, wind turbines, jet engines, and so on) to maximize revenue generated by those assets. To manage such an asset, sensor data and other associated information may be collected on the premises at which the asset is located, possibly processed to some degree on the premises by a computing system, and then transmitted via the Internet or other wide area network to a cloud computing system for further processing. For example, the data received at the cloud computing system may be provided as input to a computation model of the asset to determine various aspects of the asset, such as the estimated time until one or more components of the asset will likely require maintenance or replacement, given current operational parameters and detected conditions.

Depending on the characteristics of particular asset involved, the goals of the responsible business, the state of legacy technology at the business, and other factors, the business may choose to perform at least some processing in one or more on-premises environments instead of in the cloud, or vice-versa. However, the prior art does not provide a mechanism to seamlessly manage computation tasks in such a variety of computing environments. Given that these two or more computing environments typically provide different operating systems, software services, and/or other components of a technology stack, a developer of an application tasked with performing the processing of the data received from the asset may write two or more versions of the application: one for each computing system or platform that may be employed to perform the desired data processing of the asset-related data, as well as software to permit flexible migration of computation tasks across these two or more applications.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
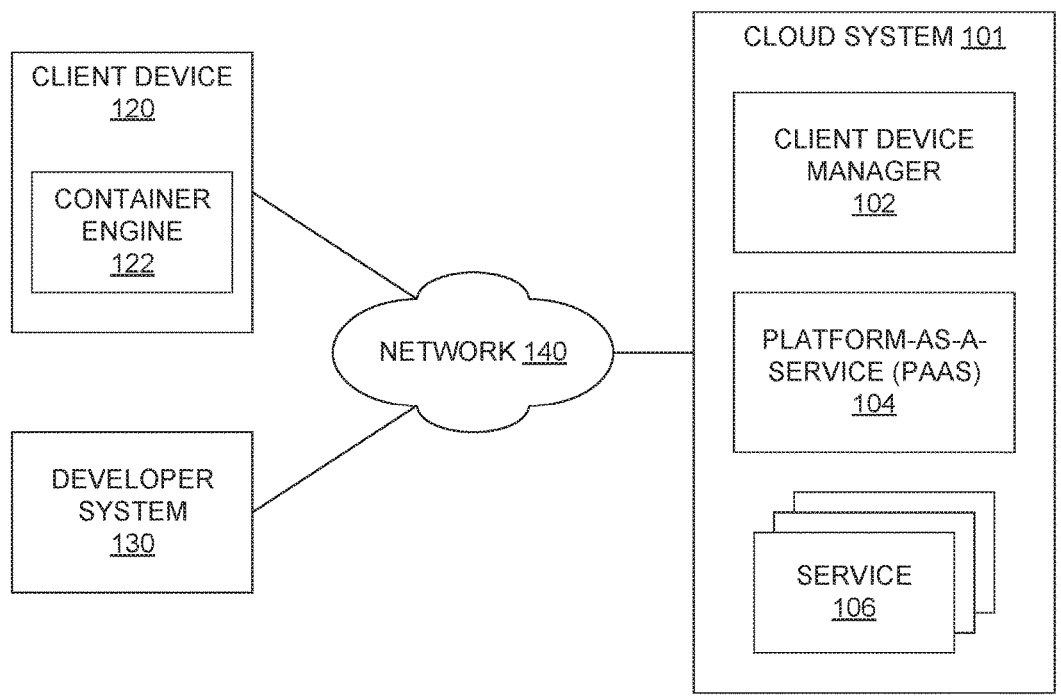
FIG. 1 is a block diagram of an example cloud system communicatively coupled via a network with a client device and a developer system.

FIG. 1 is a block diagram of a cloud system 101 including a client device manager 102, a platform-as-a-service (PaaS) 104, and one or more software services 106 available for use by other services 106 or applications. Also depicted in FIG. 1 are a client device 120 and a developer system 130. While a single client device 120 and a single developer system 130 are shown in FIG. 1 and discussed in greater detail below, multiple client devices 120, multiple developer systems 130, and/or multiple cloud systems 101 may be present in other example embodiments.

Communicatively coupling the client device 120 and the developer system 130 to the cloud system 101 is a communication network 140, such as a wide area network (WAN) (e.g., the Internet). Other types of networks may also be included as part of the network 140, such as a local area network, (LAN), a wireless WAN (WWAN), a wireless LAN (WLAN), a cellular telephone network (e.g., a third-generation (3G) or fourth-generation (4G) network), another communication network or connection, or some combination thereof.

The developer system 130, in an example embodiment, may be used by a software developer to access the PaaS 104 to develop, test, and deploy software in the form of applications or services 106 that will ultimately be executed by the cloud system 101 and/or the client device 120. That software may also employ one or more of the software services 106, which may be deployed in the cloud system 101 and/or the client device 120 for execution.

In an example embodiment, the cloud system 101 may include one or more servers, database systems, messaging systems, and the like to perform the various functions described herein. The PaaS 104 may provide infrastructure and software systems to allow a developer, via the developer system 130, to create, test, and deploy applications, as described above, which may then be executed at the cloud system 101. That software may communicate with one or more of the services 106 provided by the cloud system 101 to perform its assigned tasks. Examples of the services 106 may include, but are not limited to, messaging services, database services, data processing services, user authorization and authentication services, and so on.

The cloud system 101, as depicted in the example embodiment of FIG. 1, may also include a client device manager 102 configured to communicate with the client device 120 to authorize and authenticate the client device 120 for access to the cloud system 101, and to deploy applications and associated services 106 from the cloud system 101 to the client device 120 for execution thereon. In an example embodiment, the applications and associated services 106 may be placed in one or more software "containers," such as Docker® containers, and then transmitted via the network 140 to the client device 120 for execution thereon by way of a container engine 122, such as a Docker® engine.

The client device 120, in an example embodiment, may be a computing system capable of executing an application and associated services 106 provided by and received from the cloud system 101. In an example embodiment, the client device 120 includes a container engine 122, as mentioned above, that may execute the application and services 106 in a container provided by the cloud system 101. Also in an example embodiment, the application to be executed may be created by using the PaaS 104 via the developer system 130.

In a particular example embodiment, the cloud system 101 and the client device 120 may work cooperatively as components of an industrial Internet, or industrial Internet of Things (IIoT). For example, the cloud system 101 may communicate with one or more client devices 120 located at one or more industrial sites (e.g., power plants, wind turbines, manufacturing sites, and so on) having one or more industrial assets. In such a system, the client device 120, which may be referred to as an IoT "edge" device, may perform one or more tasks, such as sensor data collection, sensor data processing, data transmission via the network 140 to the cloud system 101, industrial asset monitoring and control, and the like. In some example embodiments, each of hundreds, thousands, or millions of edge devices may be managed using the cloud system 101. In such embodiments, the client device manager 102 may be viewed as an edge device manager capable of managing the hundreds, thousands, or millions of IoT edge devices.

The various client devices 120, in example embodiments, may represent a wide range of processing capability, data storage capacity, and other computing or processing characteristics. Consequently, some such client devices 120 may be capable of executing a particular application designed to receive and process asset sensor data and to transmit the results via the network 140 to the cloud system 101, while other client devices 120 may only have the capability of transmitting the received data, or some portion thereof, via the network 140 to the cloud system 101, upon which that same application may execute to perform the desired processing.

To facilitate the ability to execute the application in either the client device 120 or the cloud system 101, the PaaS 104, as described in greater detail below, may facilitate the development (e.g., via the developer system 130) of a single version of application source code, and thus resulting binary code, that may form the basis of one or more artifacts to be executed in conjunction with one or more services 106 upon two or more different platforms by way of the code integration and deployment process. By configuring the integration and deployment process to generate the proper executable code for a particular platform, the developer, tester, and other software personnel are relieved of the possible burden of dealing with multiple versions of the application, one for each different type of platform on which the application may be deployed.

Figure 2:
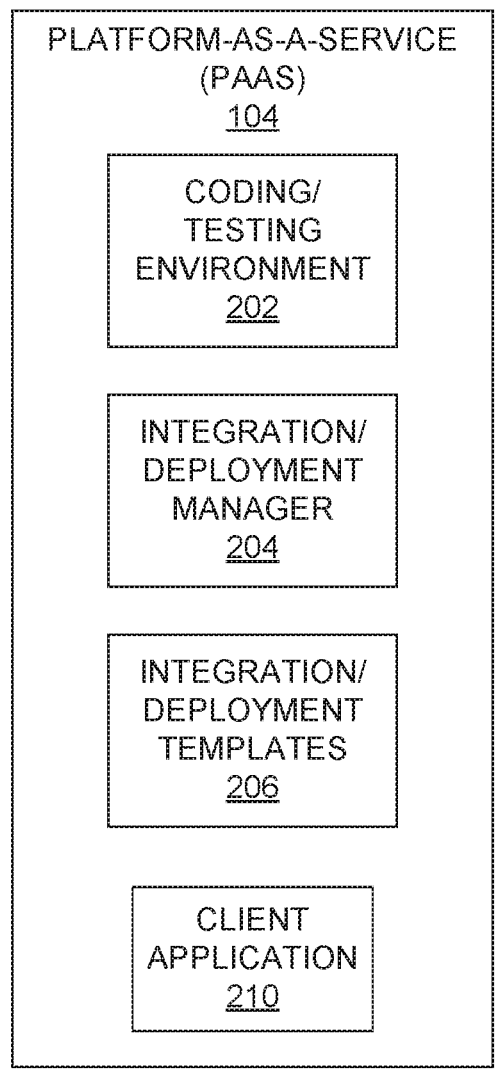
FIG. 2 is a block diagram of an example platform-as-a-service (PaaS) of the cloud system of FIG. 1.

FIG. 2 is a block diagram of an example of the PaaS 104 of the cloud system 101 of FIG. 1. As illustrated in the example embodiment of FIG. 2, the PaaS 104 may include a coding/testing environment 202, an integration/deployment manager 204, and one or more integration/deployment templates 206. The PaaS 104 may include other modules or components, but such modules and components are not depicted in FIG. 2 to simplify the following discussion.

In an example embodiment, the coding/testing environment 202 is configured to communicate with the developer system 130 and the network 140 to facilitate the writing, editing, and testing of a client application 210 to be employed in conjunction with the client device 120 and to be executed by either the client device 120 or the cloud system 101. In some example embodiments, the client application 210 may include one or more services 106 (e.g., microservices) that interact to provide the functionality that the client application 210 is intended to provide. In example embodiments in which the client application 210 depends on one or more services 106 provided by the cloud system 101, the developer may write the client application 210 according to an interface or "contract" that allows the developer to interact with the services 106 without reference as to the location of deployment of the services 106 (e.g., in the client device 120 or the cloud system 101). In one example, the client application 210 may be designed to call a particular representational state transfer (REST) endpoint to fetch a token, such as for authentication of the client device 120 with the cloud system 101. Accordingly, in this example embodiment, the call to the endpoint in the client application 210 is the same regardless of whether the service 106 or the client application 210 is deployed in the client device 120 or the cloud system 101. As a result, a single version of the client application 210 may be integrated with the one or more services 106 upon which the client application 210 depends without changing the source code or resulting (e.g., compiled) binary code of the client application 210, and the integrated application may be deployed to either the client device 120 or the cloud system 101, as directed by the developer or a party associated with the client device 120.

The integration/deployment manager 204, in an example embodiment, may be configured to integrate the client application 210 with the one or more services 106 upon which it depends, and to deploy the resulting integrated application to the client device 120 or the cloud system 101, based on an indication associated with a command to perform the integration and deployment operations. To perform the integration, in an example embodiment, the integration/deployment manager 204 is configured to resolve the dependencies of the client application 210 upon the one or more services 106 during the integration and/or deployment of the client application 210.

In an example embodiment in which the client application 210 is to be deployed on the client device 120 for execution thereon, the integration/deployment manager 204 may integrate the client application 210 with the associated services 106, and then provide the integrated application 210 to the client device manager 102. The client device manager 102 may be configured to place the integrated application 210 within one or more software containers (e.g., Docker® containers), and then transmit the one or more containers via the network 140 to the client device 120 for execution thereon by way of a container engine 122 (e.g., a Docker® engine), as indicated above. Such operations may be performed under the guidance of the integration/deployment manager 204 in example embodiments.

To perform the integration and deployment duties described above, the integration/deployment manager 204 may access the one or more integration/deployment templates 206 in some example embodiments. The templates 206, in an example embodiment, may contain information regarding each of the services 106 provided by the cloud system 101 and/or services 106 that constitute the client application 210. This information may include, for example, the location of the artifacts representing the services 106, the identity of other services 106 upon which the service 106 depends, and so on.

Figure 3:
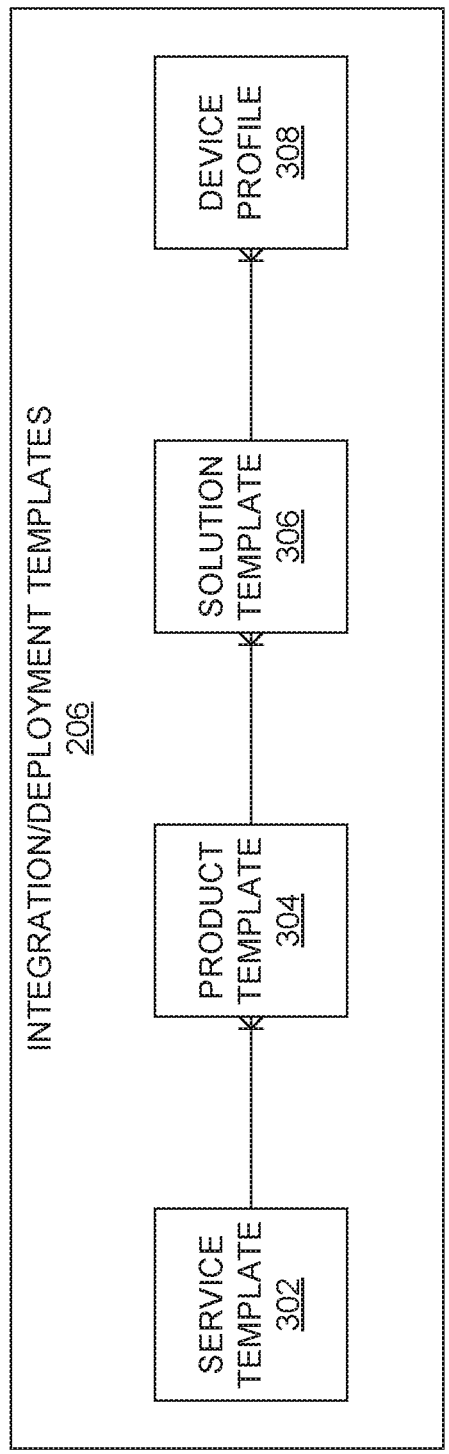
FIG. 3 is a block diagram of example integration/deployment templates employable in the PaaS of FIG. 2.

FIG. 3 is a block diagram of examples of the integration/deployment templates 206 depicted in FIG. 2. As shown in FIG. 3, multiple types of templates 206 may be employed in example embodiments, including service templates 302, product templates 304, solution templates 306, and device profiles (or, alternatively, environment profiles) 308. As indicated in FIG. 3, each service template 302 may be referenced in one or more product templates 304. Additionally, one or more product templates 304 may be references in one or more solution templates 306, and one or more solution templates 306 may be referenced in one or more device profiles 308. Other types of integration/deployment templates 206, as well as greater or fewer numbers of the types of integration/deployment templates 206, may be employed in other example embodiments.

Figure 4:
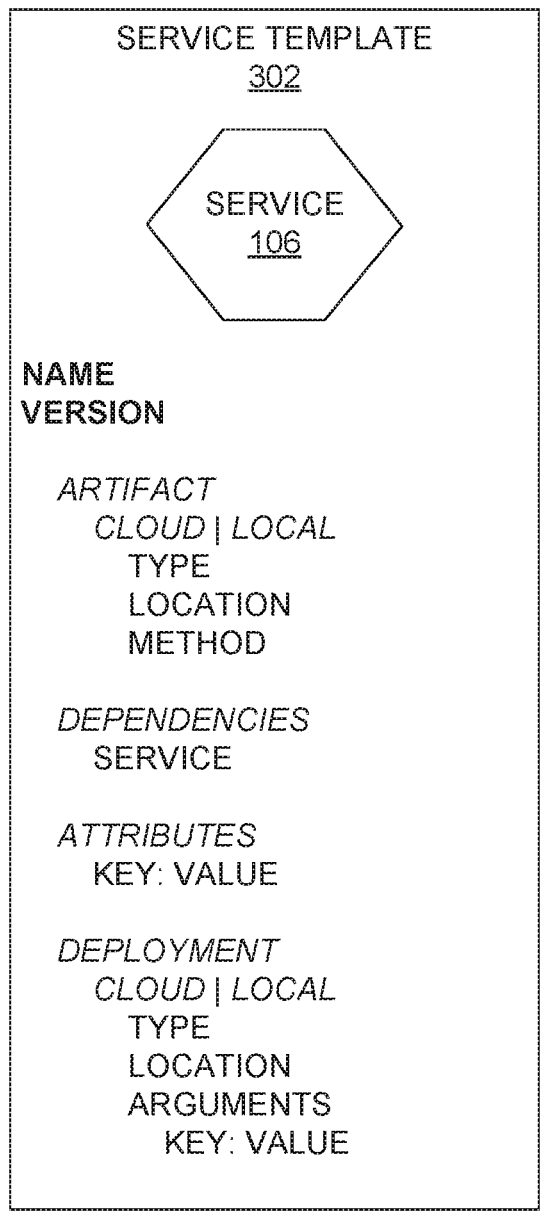
FIG. 4 is a block diagram of an example service template of the integration/deployment templates of FIG. 3.

FIG. 4 is a block diagram of an example embodiment of the service template 302. In example embodiments, each service template 302 is associated with a separate service 106 and includes information that facilitates deployment in each runtime environment (e.g., the cloud system 101, the client device 120, and so on) to which the service 106 may be deployed. Consequently, a single service template 302 may exist for each particular service 106, regardless of the number of different environments to which that service 106 may be deployed.

As depicted in the example embodiment of FIG. 4, the service template 302 may include a name and a version indicator (e.g., a version number) for the service 106. Additionally, the service template 302 may include information regarding the artifact (e.g., an executable image of the service 106) produced for each of one or more environments. For example, for a particular environment, the service template 302 may include an indication of the environment (e.g., "cloud" (e.g., on a cloud system 101) or "local" (e.g., on a client device 120)), a type or format of the artifact (e.g., a DockerImage, a Docker Trusted Registry (DTR) image, an Open Systems Gateway initiative (OSGi) image, and so on), a location of the artifact (e.g., a uniform system identifier (URI)), and a method by which to retrieve the artifact (e.g., via a version control system (VCS), such as Git®; via Hypertext Transfer Protocol (HTTP); via a local file system, etc.).

The service template 302, in an example embodiment, may also include dependency information, such as the identity of one or more other services 106 upon which the present service 106 depends. As indicated below, the present service 106 and the services 106 on which the present service 106 depends may be referenced within a product template 304.

In example embodiments, the service template 302 may also include various attributes, each of which may include a key and associated value, that provide further information regarding the service 106, its integration with other services 106 on which the present service 106 depends, and so on.

Moreover, in some example embodiments, the service template 302 may include deployment information for each of the one or more environments to which the service 106 may be deployed. For example, for a particular environment, the service template 302 may include an indication of the environment (e.g., "cloud" or "local"), the type of engine or handler to be employed to deploy the service 106 artifact (e.g., a Docker RUN image handler, a Docker Compose image handler, a shell script, etc.), a location to which the service 106 is to be deployed in the particular environment (e.g., a URI), and one or more arguments, each of which may be specified by a key-value pair denoting configuration parameters for deployment in the intended environment. Such configuration parameters may include, for example, a particular server needed for operation of the service 106 in the intended environment, such as an email server.

Figure 5:
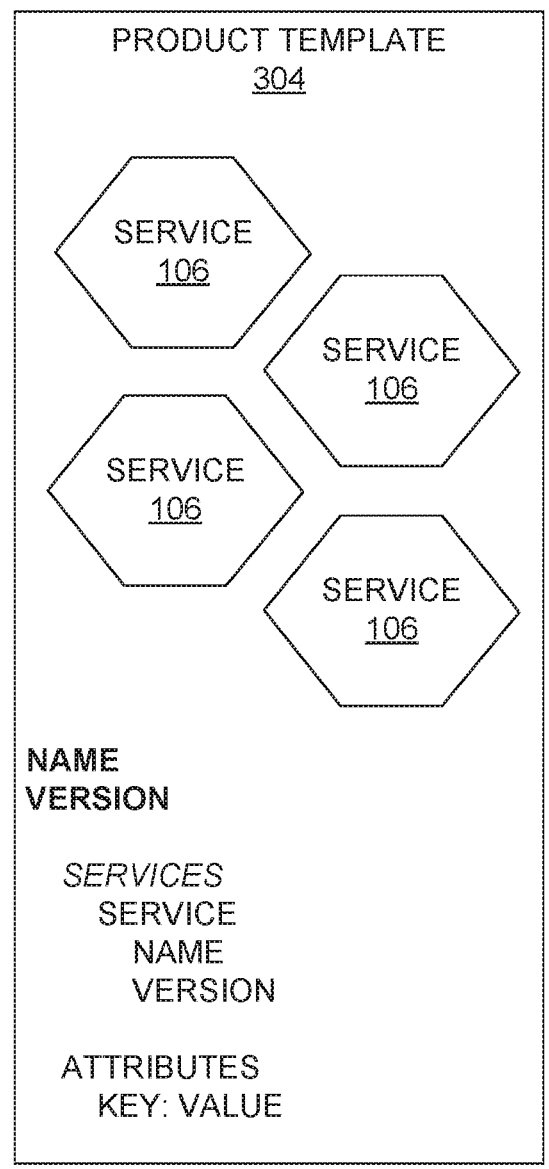
FIG. 5 is a block diagram of an example product template of the integration/deployment templates of FIG. 3.

FIG. 5 is a block diagram of an example embodiment of the product template 304 of the integration/deployment templates 206 of FIG. 3. As illustrated in FIG. 5, the product template 304 may include a name and a version indicator (e.g., a version number) for a "product" (e.g., a collection of services 106) signified by the product template 304. In an example embodiment, the product may be a software application. Additionally, the service template 302 may include information identifying each of a plurality of services 106 that are included in the product, such as by way of the name and version indicator of each corresponding service, as indicated in its corresponding service template 302. In an example embodiment, the product template 304 may refer to multiple services 106 that interact in some fashion to function as the product represented by the product template 304. In an example embodiment, the product template 304 may include configuration information for the product, such as in the form of attributes fashioned as key-value pairs.

Figure 6:
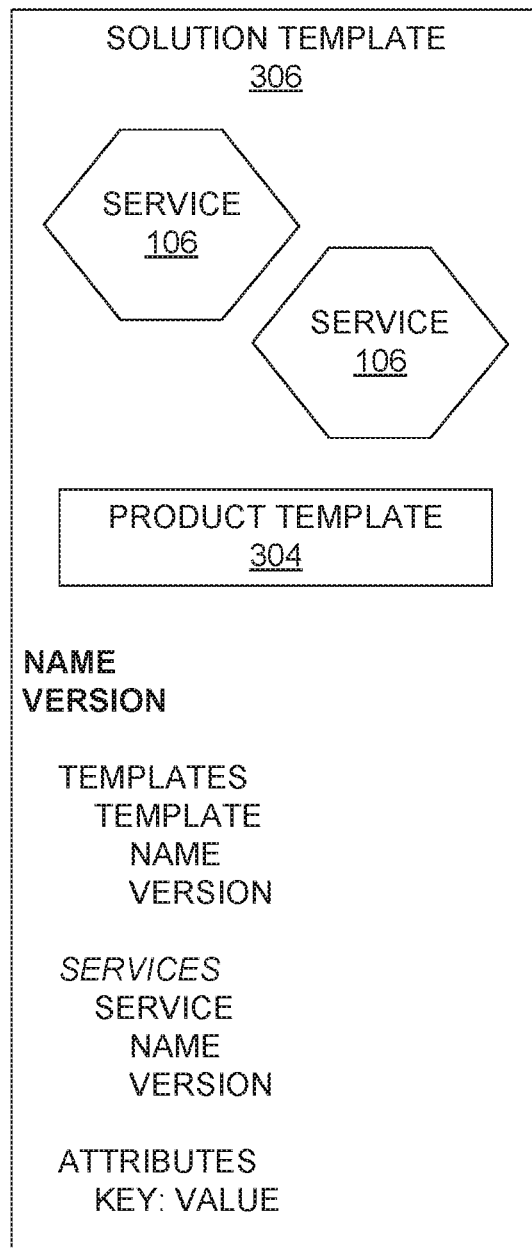
FIG. 6 is a block diagram of an example solution template of the integration/deployment templates of FIG. 3.

FIG. 6 is a block diagram of an example embodiment of a solution template 306 of the integration/deployment templates 206 of FIG. 3. In an example embodiment, the solution template 306 represents a particular "solution" (e.g., one or more applications or products, customized with one or more additional services 106). As shown in FIG. 6, the solution template 306 may include a name and a version indicator (e.g., a version number) for the solution represented by the solution template 306. In some example embodiments, the solution template 306 may refer to the one or more products by way of the name and version indicator of the product template 304 corresponding to each included product, and may refer to the one or more additional services 106 included in the solution via the name and version indicator of each of the additional services 106, as indicated in their respective service templates 302. In an example embodiment, the solution template 306 may include configuration information for the solution, such as in the form of attributes organized as key-value pairs.

Figure 7:
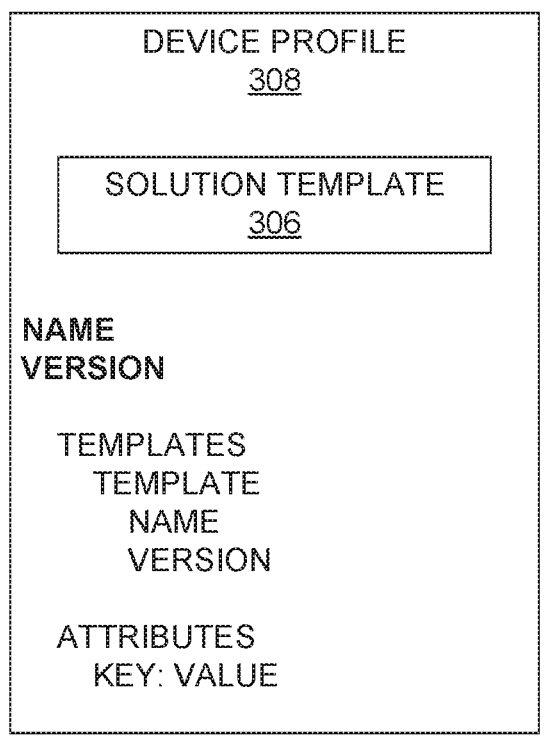
FIG. 7 is a block diagram of an example device profile of the integration/deployment templates of FIG. 3.

FIG. 7 is a block diagram of an example embodiment of a device (or environment) profile 308 of the integration/deployment templates 206 of FIG. 3. In an example embodiment, the device profile 308 is a profile for a collection of one of more solutions (e.g., solutions associated with respective solution templates 306) to be deployed to a particular device or system (e.g., the cloud system 101, the client device 120, and so on). As illustrated in FIG. 7, the device profile 308 may include a name and a version indicator (e.g., a version number) for the particular collection of software solutions intended for a particular device or environment, as represented by the device profile 308. In some example embodiments, the device profile 308 may refer to the one or more solutions by way of the name and version indicator of the solution template 306 corresponding to each included solution. In an example embodiment, the device profile 308 may include configuration information for the device profile 308, such as in the form of attributes fashioned as key-value pairs.

In example embodiments, the integration/deployment manager 204 of FIG. 2, when receiving a command to deploy software for a particular environment, may access a particular device profile 308 corresponding to the requested environment, and then proceed to access each associated solution template 306, product template 304, and service template 302 logically connected to the device profile 308, as indicated above, to retrieve the artifacts appropriate for the environment associated with the device profile 308 for all of the necessary services 106 involved. The integration/deployment manager 204 integrates the service 106 artifacts and deploys them to the particular device or environment associated with the device profile 308 based on the information provided in the various integration/deployment templates 206 corresponding to the device profile 308. An example method of operating the integration/deployment manager 204 to use the integration/deployment templates 206 is presented below in conjunction with FIG. 9.

Figure 8:
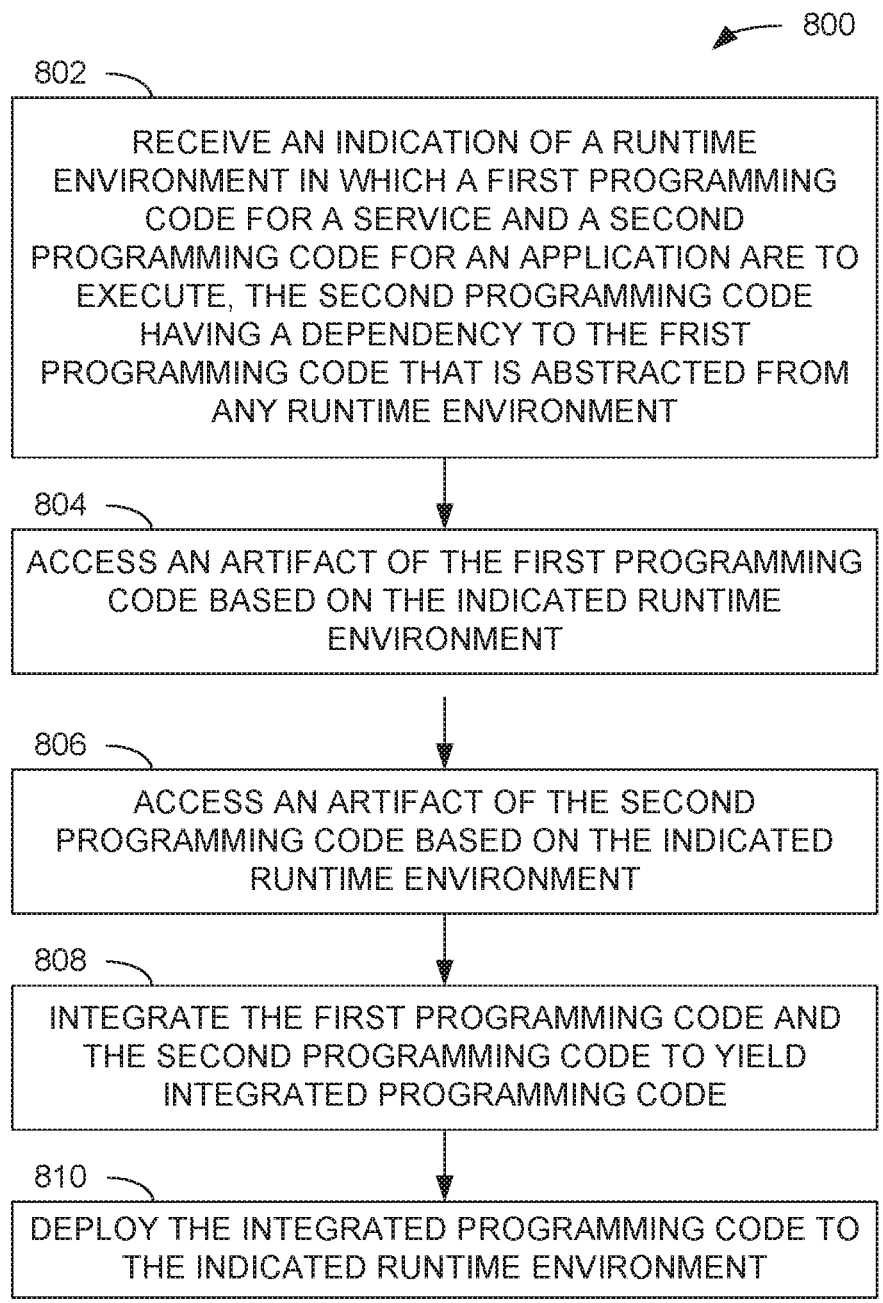
FIG. 8 is a flow diagram of an example method of operating an example integration/deployment manager of the PaaS of FIG. 2.

FIG. 8 is a flow diagram of an example method 800 of operating an example embodiment of the integration/deployment manager 204 of the PaaS 104 of FIG. 2. While the method 800 is described herein in conjunction with the integration/deployment manager 204, other components, devices, or systems may be utilized to perform the method 800 in other embodiments.

In the method 800, the integration/deployment manager 204 may receive an indication of a particular runtime environment (e.g., the cloud system 101, a particular client device 120, or the like) in which first programming code and second programming code are to execute (operation 802). In an example embodiment, the first programming code is source or binary code for a service 106, while the second programming code is source or binary code for an application (e.g., client application 210, which may be developed by a developer using a developer system 130). Also, the second programming code may include a dependency to the first programming that is abstracted from any particular runtime environment. In an example embodiment, the integration/deployment manager 204 may receive the indication in a command to integrate and deploy one or more particular applications to a specific runtime environment (e.g., a client device 120 or the cloud system 101).

The integration/deployment manager 204 may access an artifact for the first programming code (operation 804) based on the indicated runtime environment. In an example embodiment, the artifact for the first programming code (e.g., a service 106) may be accessed using information provided in a corresponding service template 302.

Similarly, the integration/deployment manager 204 may also access an artifact of the second programming code (operation 804) based on the indicated runtime environment. In example embodiments, the application may include multiple services 106 that are accessed using information provided in corresponding service templates 302. Also in an example embodiment, the dependency of the second programming code to the first programming code may be memorialized in one or more service templates 302 representing services 106 of the application, as indicated above. Moreover, in some example embodiments, while the source code or binary code for the application may be the same regardless of the ultimate runtime environments in which the application will be deployed, the particular artifacts for the application may be environment-specific.

Based on the indicated runtime environment, the integration/deployment manager 204 may integrate the artifact of the first programming code and the artifact of the second programming code to yield integrated programming code (operation 808), and deploy the integrated programming code to the indicated runtime environment (operation 810). In an example embodiment, the integration/deployment manager 204 employs the indication of the runtime environment to access a particular device profile 308, as well as the one or more solution templates 306, product templates 304, and service templates 302 associated with the device profile 308, to perform the integration and deployment operations to deploy the resulting integrated programming code to the indicated runtime environment. Moreover, the integration/deployment manager 204 may resolve runtime dependencies between the artifacts as part of the integration and/or deployment operations. In other example embodiments, the runtime dependencies may be resolved during the generation of the artifacts for the first and second programming code.

In some example embodiments in which the indicated runtime environment is a client device 120, the integration/deployment manager 204 may place the integrated programming code in one or more software containers (e.g., Docker® containers), as described above, and transmit the containers from the cloud system 101 to the client device 120 for execution on a container engine 122 executing thereon. In some example embodiments, the integrated programming code also may be placed in containers in situations in which the intended runtime environment is the cloud system 101.

While the operations 802-810 of the method 800, as well as the operations of other methods described herein, are shown as being performed in a particular order, other orders of execution, including simultaneous, concurrent, or overlapping execution of two or more operations, are possible in other example embodiments.

Figure 9:
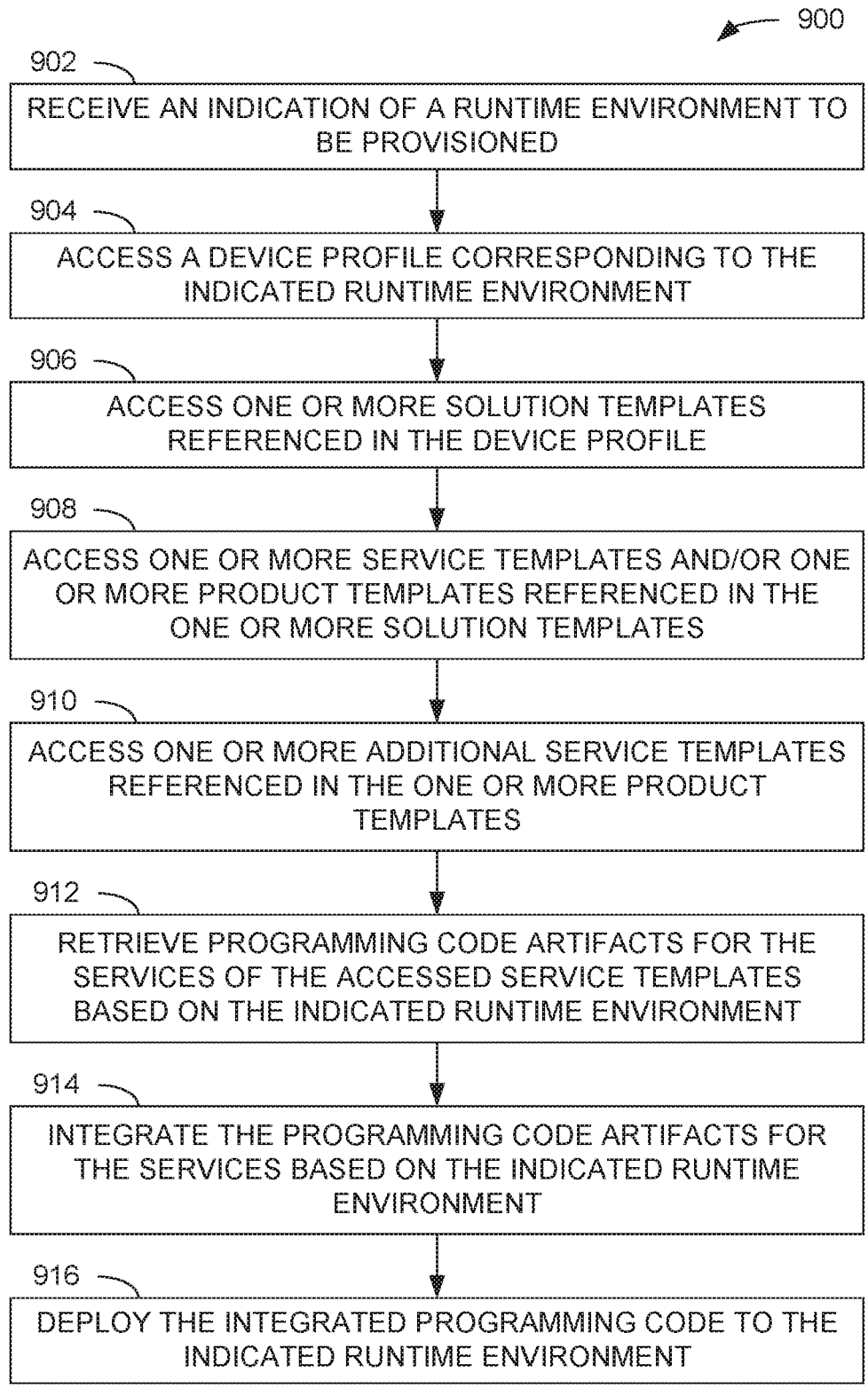
FIG. 9 is a flow diagram of an example method of operating the example integration/deployment manager of the PaaS of FIG. 2 while employing the integration/deployment templates of FIG. 3.

FIG. 9 is a flow diagram of an example method 900 of operating the example embodiment of the integration/deployment manager 204 of FIG. 2 while employing the integration/deployment templates 206 of FIGS. 3-7. In the method 900, the integration/deployment manager 204 may receive an indication of particular runtime environment (e.g., the cloud system 101, a client device 120, or the like) to be provisioned with software (operation 902). The integration/deployment manager 204 may then access a device profile 308 corresponding to the indicated runtime environment (operation 904). In an example embodiment, the accessed device profile 308 may be one of several device profiles 308 employable on the cloud system 101 or a client device 120, in which case the integration/deployment manager 204 may also receive some indication of the particular desired device profile 308 to be accessed.

The integration/deployment manager 204 may also access one or more solution templates 306 referenced in the device profile 308 (operation 906), access one or more service templates 302 and/or one or more product templates 304 referenced in each of the one or more solution templates 306 (operation 908), and access one or more additional service templates 302 referenced in the one or more product templates 304 (operation 910).

The integration/deployment manager 204, in example embodiments, may retrieve artifacts of the programming code for each of the resulting services 106 referenced in each of the service templates 302 based on the indicated runtime environment (operation 912). The integration/deployment manager 204 may then integrate the appropriate artifacts for each of the services 106 based on the indicated runtime environment (operation 914) and deploy the resulting integrated programming code to the indicated runtime environment (operation 916), as indicated above. In example embodiments, to retrieve and integrate the artifacts and deploy the resulting integrated code, the integration/deployment manager 204 may employ the various types of information regarding the types of artifacts involved; the location of the artifacts; the tools or handlers to retrieve, integrate, and deploy the artifacts; and other information stored in the various accessed service templates 302, product templates 304, and solution templates 306 associated with the device profile 308 corresponding to the indicated runtime environment, as discussed earlier.

In an example embodiment, a method for deployment of runtime environment-agnostic services comprises receiving, by an integration/deployment manager executing on at least one hardware processor of a computing system, an indication of a runtime environment in which a first programming code and a second programming code are to execute, the second programming code comprising a dependency to the first programming code that is abstracted from the runtime environment; accessing an artifact of the first programming code by the integration/deployment manager based at least in part on the indication of the runtime environment; accessing an artifact of the second programming code from the data store by the integration/deployment manager based at least in part on the indication of the runtime environment; integrating the artifact of the first programming code and the artifact of the second programming code by the integration/deployment manager to yield integrated programming code; and deploying the integrated programming code to the indicated runtime environment by the integration/deployment manager.

In another example embodiment, including all previous example embodiments, the first programming code is for a software service and the second programming code is for a software application.

In another example embodiment, including all previous example embodiments, the dependency comprises an abstraction of an endpoint to be called to access the software service; and the integrating of the first programming code and the second programming code comprises resolving the dependency based on the indicated runtime environment.

In another example embodiment, including all previous example embodiments, a cloud computing system comprises the computing system and the indicated runtime environment.

In another example embodiment, including all previous example embodiments, the integrating of the artifact of the first programming code and the artifact of the second programming code comprises incorporating the artifact of the first programming code and the artifact of the second programming code in one or more software containers; and the deploying of the integrated programming code comprises the computing system transmitting, via a communication network, the one or more software containers to a client system providing the indicated runtime environment for execution on a container engine.

In another example embodiment, including all previous example embodiments, the method further comprises accessing a device profile for the indicated runtime environment based at least in part on the indicated runtime environment, the device profile comprising configuration information referencing the software application and the software service; wherein the accessing of the artifact of the first programming code and the accessing of the artifact of the second programming code are based on the configuration information.

In another example embodiment, including all previous example embodiments, the configuration information referencing the software application comprises a solution template, the solution template comprising configuration information referencing one or more software services included in the software application; and the method further comprises integrating artifacts of programming code for the one or more software services to produce the artifact of second programming code for the software application.

In another example embodiment, including all previous example embodiments, the configuration information referencing the software service comprises a service template for the software service; and the service template comprises first configuration information for the artifact of the first programming code corresponding to the indicated runtime environment.

In another example embodiment, including all previous example embodiments, the service template further comprises second configuration information for an artifact of the first programming code corresponding to another runtime environment separate from the indicated runtime environment.

In another example embodiment, including all previous example embodiments, the first configuration information comprises an indication of an artifact type of the artifact of the first programming code.

In another example embodiment, including all previous example embodiments, the first configuration information comprises an indication of a storage location of the artifact of the first programming code.

In another example embodiment, including all previous example embodiments, the first configuration information comprises an indication of a method by which the artifact of the first programming code is accessed.

In another example embodiment, including all previous example embodiments, the first configuration information comprises an indication of a deployment type of the artifact of the first programming code.

In another example embodiment, including all previous example embodiments, the first configuration information comprises an indication of a location to which the artifact of the first programming code is to be deployed within the indicated runtime environment.

In another example embodiment, including all previous example embodiments, the first configuration information comprises an indication of at least one other software service, wherein deployment of the software service depends upon availability of the at least one other software service in the indicated runtime environment.

In an example embodiment, a system comprises one or more hardware processors, and a memory storing instructions that, when executed by at least one of the one or more hardware processors, cause the system to perform operations comprising receiving an indication of a runtime environment in which a first programming code and a second programming code are to execute, the second programming code comprising a dependency to the first programming code that is abstracted from the runtime environment; accessing an artifact of the first programming code from a data store based at least in part on the indication of the runtime environment; accessing an artifact of the second programming code from the data store based at least in part on the indication of the runtime environment; integrating the artifact of the first programming code and the artifact of the second programming code to yield integrated programming code; and deploying the integrated programming code to the indicated runtime environment.

In another example embodiment, including all previous example embodiments, a cloud computing system comprises the system and the indicated runtime environment.

In another example embodiment, including all previous example embodiments, a cloud computing system comprises the system; a client device comprises the indicated runtime environment; and the deploying of the integrated programming code comprises transmitting the integrated programming code to the client device via a communication network.

In another example embodiment, including all previous example embodiments, the integrating of the artifact of the first programming code and the artifact of the second programming code comprises incorporating the artifact of the first programming code and the artifact of the second programming code into one or more software containers for execution on a container engine in the client device.

In another example embodiment, including all previous example embodiments, the client device is communicatively coupled to an industrial asset; and the software application is configured to process data received at the client device.

In an example embodiment, a non-transitory computer-readable storage medium stores instructions that, when executed by at least one hardware processor of a machine, cause the machine to perform operations comprising receiving an indication of a runtime environment in which a first programming code and a second programming code are to execute, the second programming code comprising a dependency to the first programming code that is abstracted from the runtime environment; accessing an artifact of the first programming code from a data store based at least in part on the indication of the runtime environment; accessing an artifact of the second programming code from the data store based on the indicated runtime environment; integrating the artifact of the first programming code and the artifact of the second programming code to yield integrated programming code; and deploying the integrated programming code to the indicated runtime environment.

Figure 10:
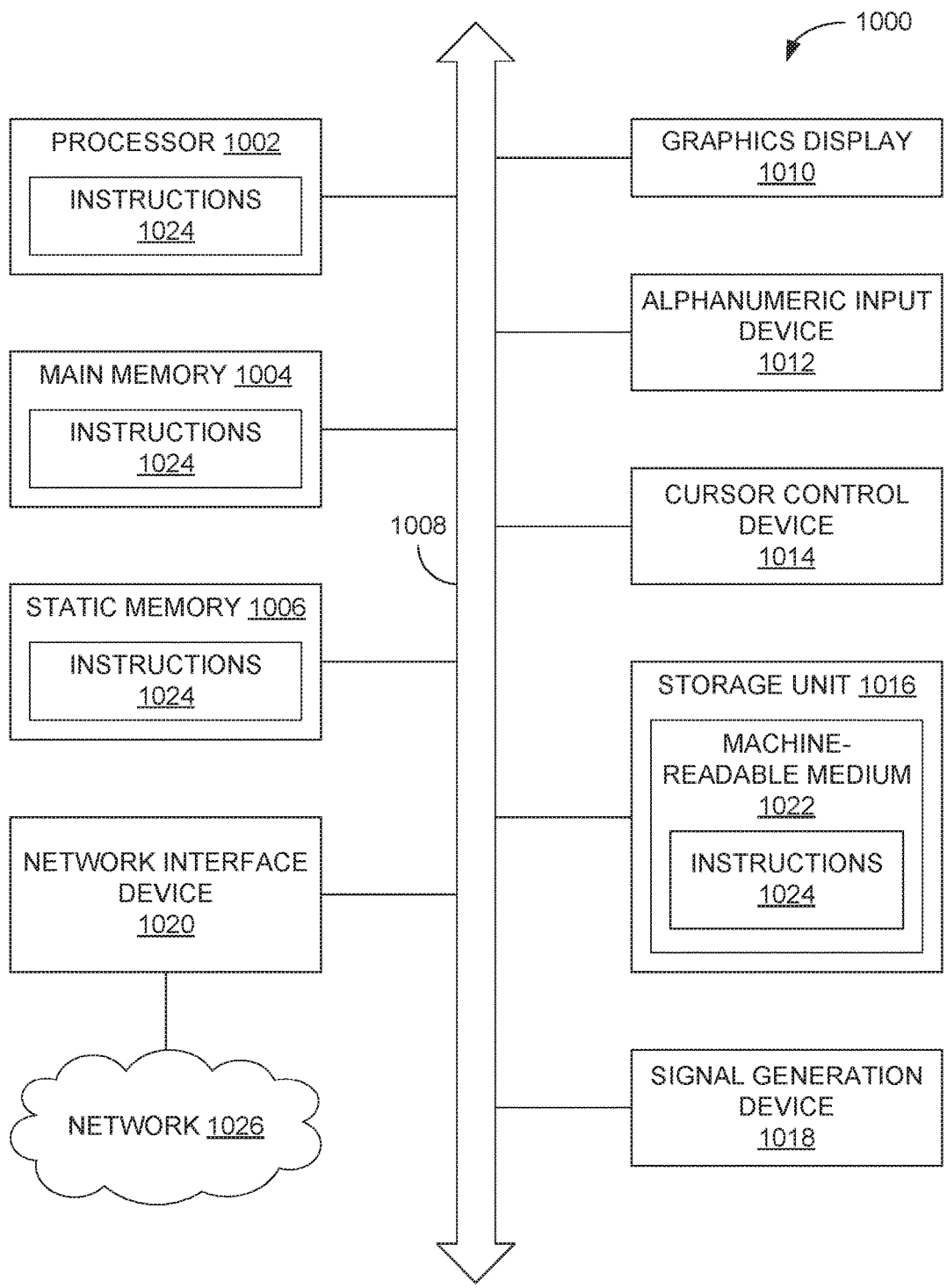
FIG. 10 is a block diagram of a machine or device in the example form of a computer system within which instructions for causing the machine or device to perform any one or more of the methodologies discussed herein may be executed.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, or a computer-readable storage medium) and perform any one or more of the methodologies discussed herein, in whole or in part. Specifically, FIG. 10 depicts the machine 1000 in the example form of a computer device (e.g., a computer) within which the instructions 1024 (e.g., software, firmware, a program, an application, an applet, an app, or other executable code) for causing the machine 1000 to perform any one or more of the methodologies discussed herein, in whole or in part.

For example, the instructions 1024 may cause the machine 1000 to execute the flow diagrams of FIGS. 8 and 9, as well as all example embodiments associated therewith. The instructions 1024 can transform the general, non-programmed machine 1000 into a particular machine (e.g., specially configured machine) programmed to carry out the described and illustrated functions in the manner described. Also, in example embodiments, the machine 1000 may operate as one or more of the modules or components of the cloud system 101 of FIG. 1 (including the PaaS 104 and/or the integration/deployment device manager 204 included therein), or any other computing system or device described herein.

In example embodiments, the machine 1000 operates as a standalone device or may be connected (e.g., networked) to other machines. The machine 1000 may be a server computer, an IIoT gateway, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 1000 capable of executing the instructions 1024, sequentially or otherwise, that specify actions to be taken by that machine 1000. Further, while only a single machine 1000 is illustrated, the term "machine" shall also be taken to include a collection of machines 1000 that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light-emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes the machine-readable medium 1022 (e.g., a tangible machine-readable storage medium) on which is stored the instructions 1024 embodying any one or more of the methodologies or functions described herein. The instructions 1024 may also reside, completely or at least partially, within the main memory 1004, within the processor 1002 (e.g., within a cache memory of the processor 1002), or both, before or during execution thereof by the machine 1000. Accordingly, the main memory 1004 and the processor 1002 may be considered machine-readable media 1022 (e.g., tangible and non-transitory machine-readable media).

In some example embodiments, the machine 1000 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1022 able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing instructions 1024 for execution by a machine (e.g., machine 1000), such that the instructions 1024, when executed by one or more processors of the machine 1000 (e.g., processor 1002), cause the machine 1000 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1022 is non-transitory in that it does not embody a propagating or transitory signal. However, labeling the machine-readable medium 1022 as "non-transitory" should not be construed to mean that the medium is incapable of movement; the medium should be considered as being transportable from one physical location to another in some example embodiments. Additionally, since the machine-readable medium 1022 is tangible, the medium may be considered a machine-readable device.

The instructions 1024 may further be transmitted or received over a communications network 1026 using a transmission medium via the network interface device 1020 and utilizing any one of a number of well-known transfer protocols (e.g., Hypertext Transfer Protocol (HTTP)). Examples of communication networks 1026 include a local area network (LAN), a wide area network (WAN), the Internet, mobile telephone networks, plain old telephone service (POTS) networks, and wireless data networks (e.g., Wi-Fi®, LTE®, and WiMAX™ networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain example embodiments are described herein as including logic or a number of components, modules, or mechanisms. Modules may constitute either software modules (e.g., code embodied on a machine-readable medium 1022 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for deployment of runtime environment-agnostic services, the method comprising:
   receiving, by an integration/deployment manager executing on at least one hardware processor of a computing system, an indication of a runtime environment in which a first programming code and a second programming code are to execute, the second programming code comprising a dependency to the first programming code that is abstracted from the runtime environment, the indication of the runtime environment being an indication that the environment is at a cloud system deployed at the cloud, or is a client device, the first programming code being source or binary code for a software service, the second programming code being source or binary code for a software application that depends upon the software service;
   storing a device profile and a service template at a data store, the device profile being logically connected to the service template;
   wherein the device profile comprises configuration information referencing the software application, wherein the service template includes the dependency of the second programming code to the first programming code and the dependency comprises an abstraction of an endpoint to be called to access the software service, wherein the service template references a first artifact, the first artifact being an executable image of the software service;
   after receiving a command to deploy software in a particular environment, accessing the first artifact of the first programming code from the data store by the integration/deployment manager based at least in part on the indication of the runtime environment and using the service template;
   after receiving the command to deploy software in a particular environment, accessing a second artifact of the second programming code from the data store by the integration/deployment manager based at least in part on the indication of the runtime environment;
   subsequently integrating the first artifact of the first programming code and the second artifact of the second programming code by the integration/deployment manager to yield integrated programming code, wherein the integrating is effective to resolve runtime dependencies between the first artifact and the second artifact;
   deploying the integrated programming code to the indicated runtime environment by the integration/deployment manager; and
   such that the integrated programming code is deployable and executable at the cloud system or the client device and is the only version of the software application that is deployed at the cloud system or client device to avoid the occurrence of multiple versions of the software application.

2. The method of claim 1, wherein:
a cloud computing system comprises the computing system and the indicated runtime environment.

3. The method of claim 1, wherein:
the integrating of the first artifact of the first programming code and the second artifact of the second programming code comprises incorporating the artifact of the first programming code and the artifact of the second programming code in one or more software containers; and
the deploying of the integrated programming code comprises the computing system transmitting, via a communication network, the one or more software containers to a client system providing the indicated runtime environment for execution on a container engine.

4. The method of claim 1, further comprising:
wherein the accessing of the first artifact of the first programming code and the accessing of the second artifact of the second programming code are based on the configuration information.

5. The method of claim 4, wherein:
the configuration information referencing the software application comprises a solution template, the solution template comprising configuration information referencing one or more software services included in the software application; and
the method further comprises integrating artifacts of programming code for the one or more software services to produce the artifact of the second programming code for the software application.

6. The method of claim 4, wherein:
the configuration information comprises first configuration information for the first artifact of the first programming code corresponding to the indicated runtime environment.

7. The method of claim 6, wherein:
the service template further comprises second configuration information for the first artifact of the first programming code corresponding to another runtime environment separate from the indicated runtime environment.

8. The method of claim 6, wherein:
the first configuration information comprises an indication of an artifact type of the first artifact of the first programming code.

9. The method of claim 6, wherein:
the first configuration information comprises an indication of a storage location of the first artifact of the first programming code.

10. The method of claim 6, wherein:
the first configuration information comprises an indication of a method by which the first artifact of the first programming code is accessed.

11. The method of claim 6, wherein:
the first configuration information comprises an indication of a deployment type of the first artifact of the first programming code.

12. The method of claim 6, wherein:
the first configuration information comprises an indication of a location to which the first artifact of the first programming code is to be deployed within the indicated runtime environment.

13. The method of claim 6, wherein:
the first configuration information comprises an indication of at least one other software service, wherein deployment of the software service depends upon availability of the at least one other software service in the indicated runtime environment.

14. A system comprising:
one or more hardware processors; and
a memory storing instructions that, when executed by at least one of the one or more hardware processors, cause the system to perform operations comprising:
receiving an indication of a runtime environment in which a first programming code and a second programming code are to execute, the second programming code comprising a dependency to the first programming code that is abstracted from the runtime environment, the indication of the runtime environment being an indication that the environment is at a cloud system deployed at the cloud, or is a client device, the first programming code being source or binary code for a software service, the second programming code being source or binary code for a software application that depends upon the software service;
storing a device profile and a service template at a data store, the device profile being logically connected to the service template;
wherein the device profile comprises configuration information referencing the software application, wherein the service template includes the dependency of the second programming code to the first programming code and the dependency comprises an abstraction of an endpoint to be called to access the software service, wherein the service template references a first artifact, the first artifact being an executable image of the software service;
after receiving a command to deploy software in a particular environment, accessing the first artifact of the first programming code from a data store based at least in part on the indication of the runtime environment and using the service template;
after receiving the command to deploy software in a particular environment, accessing a second artifact of the second programming code from the data store based at least in part on the indication of the runtime environment;
subsequently integrating the first artifact of the first programming code and the second artifact of the second programming code to yield integrated programming code, wherein the integrating is effective to resolve runtime dependencies between the first artifact and the second artifact; and
deploying the integrated programming code to the indicated runtime environment;
such that the integrated programming code is deployable and executable at the cloud system or the client device and is the only version of the software application that is deployed at the cloud system or client device to avoid the occurrence of multiple versions of the software application.

15. The system of claim 14, wherein:
a cloud computing system comprises the system and the indicated runtime environment.

16. The system of claim 14, wherein:
the deploying of the integrated programming code comprises transmitting the integrated programming code to the client device via a communication network.

17. The system of claim 16, wherein:
the integrating of the first artifact of the first programming code and the second artifact of the second programming code comprises incorporating the first artifact of the first programming code and the second artifact of the second programming code into one or more software containers for execution on a container engine in the client device.

18. The system of claim 16, wherein:
the client device is communicatively coupled to an industrial asset; and
the software application is configured to process data received at the client device.

19. A non-transitory computer-readable storage medium storing instructions that, when executed by at least one hardware processor of a machine, cause the machine to perform operations comprising:
receiving an indication of a runtime environment in which a first programming code and a second programming code are to execute, the second programming code comprising a dependency to the first programming code that is abstracted from the runtime environment, the indication of the runtime environment being an indication that the environment is at a cloud system deployed at the cloud, or is a client device, the first programming code being source or binary code for a software service, the second programming code being source or binary code for a software application that depends upon the software service;
storing a device profile and a service template at a data store, the device profile being logically connected to the service template;
wherein the device profile comprises configuration information referencing the software application, wherein the service template includes the dependency of the second programming code to the first programming code and the dependency comprises an abstraction of an endpoint to be called to access the software service, wherein the service template references a first artifact, the first artifact being an executable image of the software service;
after receiving a command to deploy software in a particular environment, accessing a first artifact of the first programming code from a data store based at least in part on the indication of the runtime environment;
after receiving the command to deploy software in a particular environment, accessing a second artifact of the second programming code from the data store based at least in part on the indication of the runtime environment;
subsequently integrating the first artifact of the first programming code and the second artifact of the second programming code to yield integrated programming code, wherein the integrating is effective to resolve runtime dependencies between the first artifact and the second artifact; and
deploying the integrated programming code to the indicated runtime environment;
such that the integrated programming code is deployable and executable at the cloud system or the client device and is the only version of the software application that is deployed at the cloud system or client device to avoid the occurrence of multiple versions of the software application.

* * * * *